(12) United States Patent
Bacle et al.

(10) Patent No.: US 12,385,453 B2
(45) Date of Patent: Aug. 12, 2025

(54) AUTONOMOUS AGRICULTURAL MACHINE EQUIPPED WITH AN EXPLODED ENGINE SYSTEM

(71) Applicant: EXEL INDUSTRIES, Epernay (FR)

(72) Inventors: Thibault Bacle, Lyons (FR); Jocelyn Gautier, Lyons (FR); Paul Jeantet, Paris (FR)

(73) Assignee: EXEL INDUSTRIES, Epernay (FR)

( * ) Notice: Subject to any disclaimer, the term of this patent is extended or adjusted under 35 U.S.C. 154(b) by 168 days.

(21) Appl. No.: 18/498,393

(22) Filed: Oct. 31, 2023

(65) Prior Publication Data

US 2024/0175414 A1    May 30, 2024

(30) Foreign Application Priority Data

Nov. 28, 2022    (FR) ..................................... 2212419

(51) Int. Cl.
*A01C 23/04* (2006.01)
*A01M 7/00* (2006.01)
(Continued)

(52) U.S. Cl.
CPC ..... *F02M 35/10262* (2013.01); *A01C 23/047* (2013.01); *A01M 7/0042* (2013.01);
(Continued)

(58) Field of Classification Search
CPC ....... F02M 35/10262; F02M 35/10013; F02M 35/10268; F02M 35/161; F05D 2220/40;
(Continued)

(56) References Cited

U.S. PATENT DOCUMENTS

2005/0006048 A1* 1/2005 Vuk .......................... F01P 3/18
  165/41
2016/0318387 A1* 11/2016 Kuhn ..................... B60K 13/02
(Continued)

FOREIGN PATENT DOCUMENTS

DE    102009023771 A1    12/2010
EP        1496214 A1     1/2005
(Continued)

OTHER PUBLICATIONS

Search Report from the French Intellectual Property Office on corresponding FR application (FR2212419) dated Jul. 19, 2023.

*Primary Examiner* — Jacob M Amick
(74) *Attorney, Agent, or Firm* — Alumen IP Law PC

(57) ABSTRACT

The present invention relates to an autonomous agricultural machine comprising a frame having an inverted U-section, the autonomous agricultural machine having a roof and comprising a thermal engine system comprising an engine, the autonomous agricultural machine comprising a cooling system having an air circulation duct arranged in the upper part of the frame, directly under the roof, the duct having at least one opening to allow the intake of outside air into the air circulation duct and an upper air outlet to expel the hot air upwards, to the top of the roof, the cooling system also comprising a ventilation device to ensure air circulation in the air circulation duct, the air circulation duct being configured to allow the circulation of fresh air to cool the engine.

13 Claims, 2 Drawing Sheets

(51) Int. Cl.
 F01P 1/06 (2006.01)
 F01P 5/02 (2006.01)
 F01P 5/06 (2006.01)
 F02M 35/10 (2006.01)
 F02M 35/16 (2006.01)

(52) U.S. Cl.
 CPC ............... *F01P 1/06* (2013.01); *F01P 5/02* (2013.01); *F01P 5/06* (2013.01); *F02M 35/10013* (2013.01); *F02M 35/10268* (2013.01); *F02M 35/161* (2013.01); *F05D 2220/40* (2013.01)

(58) Field of Classification Search
 CPC ....... A01C 23/047; A01M 7/0042; F01P 1/00; F01P 2001/005; F01P 1/06; F01P 5/02; F01P 5/06
 See application file for complete search history.

(56) References Cited

U.S. PATENT DOCUMENTS

2018/0304936 A1* 10/2018 Watabe ..................... F01P 1/06
2022/0142140 A1* 5/2022 Wakuta ................. B62D 55/06

FOREIGN PATENT DOCUMENTS

| EP | 3210467 A1 | 8/2017 |
| EP | 3987898 A1 | 4/2022 |
| FR | 2608989 A1 | 7/1988 |
| WO | 2017/201445 A1 | 11/2017 |

* cited by examiner

AUTONOMOUS AGRICULTURAL MACHINE EQUIPPED WITH AN EXPLODED ENGINE SYSTEM

TECHNICAL FIELD

The present invention relates to the field of autonomous agricultural machines. In particular, the present invention relates to an autonomous agricultural machine, in particular suitable for spraying treatment product on crops, comprising in particular two tanks arranged on each side, between the front wheel and the rear wheel, in the wheelbase of the machine, and relates to such an autonomous agricultural machine equipped with an exploded combustion engine system.

BACKGROUND

The state of the art comprises examples of autonomous agricultural machines, in particular autonomous agricultural spraying machines the function of which is to spray a liquid treatment product on crops. For example, such a known autonomous agricultural spraying machine can be configured to spray an active product onto vines.

Such autonomous agricultural machines have a frame and four wheels, as well as tooling and/or two side tanks, arranged on their sides, between the front wheel and the rear wheel, on each side.

A general problem, in this context, is the need for more power. The known autonomous agricultural machines have petrol or electric engine systems with power typically below 30 hp.

This may be insufficient, in particular for certain tooling or in the case where the machine must carry more equipment.

To meet this need, the use of a diesel-type combustion engine system is considered.

But the integration of such a diesel-type combustion engine system requires the integration of an exhaust, air filter, cooling system, etc.

In order to integrate such an engine system with its accessories, it is a priori necessary to increase the volume of the autonomous agricultural machine, either by having the equipment and accessory longitudinally offset, i.e. extending at least partially beyond the frame of the machine, in length, outwards, or by arranging the equipment on top of the machine, so as to increase the total height of the machine. Otherwise, it would be necessary to widen the agricultural machine, which is impossible in most cases, as the width and wheelbase of agricultural machines are constrained by the width of the vegetation, typically rows of vines, and by the spacing between the rows. The length of the machines is constrained by the need to have adequate maneuverability.

Thus, the known solutions or that may a priori be considered have disadvantages. The presence of longitudinally offset elements increases the size and the risk of collision with the environment. Indeed, if tools mounted on the autonomous agricultural machine were to be located at the front or rear of the machine, offset, then these tools would no longer be on fully known, predictable and controllable positions and trajectories, and therefore would have a risk in the planning of the autonomous navigation of the autonomous agricultural machine, and therefore induce a safety risk.

In addition, increasing the height of the machine raises its center of gravity, which reduces its stability and increases the risk of the machine tipping over, in particular on a plot comprising slopes and cant. Increasing the width is not desirable or even impossible.

To overcome these disadvantages, the present invention proposes an autonomous agricultural machine with an exploded combustion engine system and a specific cooling system.

SUMMARY OF THE INVENTION

More precisely, the object of the invention is an autonomous agricultural machine comprising a frame having an inverted U section, to which at least one front wheel and at least one rear wheel are connected and defining a track, the frame having two sides, corresponding to the branches of the inverted U and a roof, corresponding to the base of the inverted U;

The autonomous agricultural machine also comprises a combustion engine system with an engine.

The autonomous agricultural machine comprises a cooling system having an air circulation duct arranged in the upper part of the frame, directly under the roof, the air circulation duct having at least one opening to allow the intake of outside air into the air circulation duct and an upper air outlet to expel hot air upwards, above the roof.

The cooling system also comprises a ventilation device to ensure air circulation in the air circulation duct.

The air circulation duct is configured to allow the circulation of air to cool the engine, in particular to cool a flow of water circulating in the engine and/or an oil flow circulating in hydraulic circuits of hydraulic systems of the autonomous agricultural machine.

According to one embodiment, the air circulation duct comprises longitudinal and transverse corridors arranged to create, between these corridors, at least one volume, the autonomous agricultural machine comprising at least one radiator arranged in said volume, so as to dissipate heat into the air circulating in the air circulation duct.

Advantageously, the ventilation device comprises at least one fan arranged above the roof.

According to one embodiment, the air circulation duct has a rear opening and two longitudinal openings to allow the intake of outside air into the air circulation duct.

In particular, the at least one opening of the air circulation duct may be closed by a grid configured to allow air to pass and to block the intake of foreign bodies into the air circulation duct.

According to one embodiment, the engine system also comprises an exhaust device and an air filter, the engine being arranged on one side of the frame, i.e. substantially in alignment with a branch of the U-section of the frame, and the air filter being arranged opposite the engine, i.e. substantially in alignment with an opposite branch of the U-section of the frame, the air filter being connected to the engine by an air circulation channel.

Advantageously, the autonomous agricultural machine further comprises at least one main forward pump, a booster pump of the main forward pump and an accessory pump arranged in a volume located between a tool holder zone, located in the track and in the wheelbase of the autonomous agricultural machine, and the roof, the main forward pump being configured to provide hydraulic energy to hydraulic systems allowing the moving forward of the autonomous agricultural machine and the accessory pump being configured to provide hydraulic energy to hydraulic systems allowing the animation of tooling mounted on the tool holder.

According to one embodiment, the autonomous agricultural machine comprises a turbo and an intermediate cooler, wherein the cooling system is further configured to cool an intake air circulation at the outlet of the turbo, the intake air circulation at the outlet of the turbo being cooled by the air circulating in the air circulation duct by means of the intermediate cooler.

In particular, the engine is a diesel engine, for example, with power of more than 50 hp.

According to one embodiment, the autonomous agricultural machine forms an autonomous agricultural spraying machine comprising two side tanks substantially arranged between the front wheel and the rear wheel, respectively on each side of the autonomous agricultural spraying machine, the autonomous agricultural spraying machine further comprising a spraying system, the spraying system comprising at least two side collector panels, the side tanks and collector panels being located in the track of the autonomous agricultural spraying machine, corresponding to its width, substantially in the alignment of each side defined by the frame, on each side of the autonomous agricultural spraying machine.

BRIEF DESCRIPTION OF THE DRAWINGS

The invention will be better understood upon reading the following description, given solely as an example, and by referring to the accompanying figures, given as non-limiting examples, wherein identical references are given to similar objects and in which.

Note that the figures disclose the invention in detail in order to enable the implementation of the invention; although non limiting, said figures are especially used to better define the invention where applicable.

DETAILED DESCRIPTION OF THE INVENTION

The invention relates to an autonomous agricultural machine. In one embodiment, the autonomous agricultural machine is configured to enable the spraying of active product. In this case, the autonomous agricultural machine comprises side tanks containing a treatment product.

For example, the autonomous agricultural machine is a four-wheeled, autonomous high-clearance machine, enabling, for example, the treatment of vines. In this case, the side tanks are in particular arranged on either side, between the front wheel and the rear wheel, in the wheelbase of the autonomous agricultural spraying machine.

However, the autonomous agricultural machine may be configured to perform other functions using other tooling. For example, the autonomous agricultural machine may be equipped with a trimmer.

Figure 1:
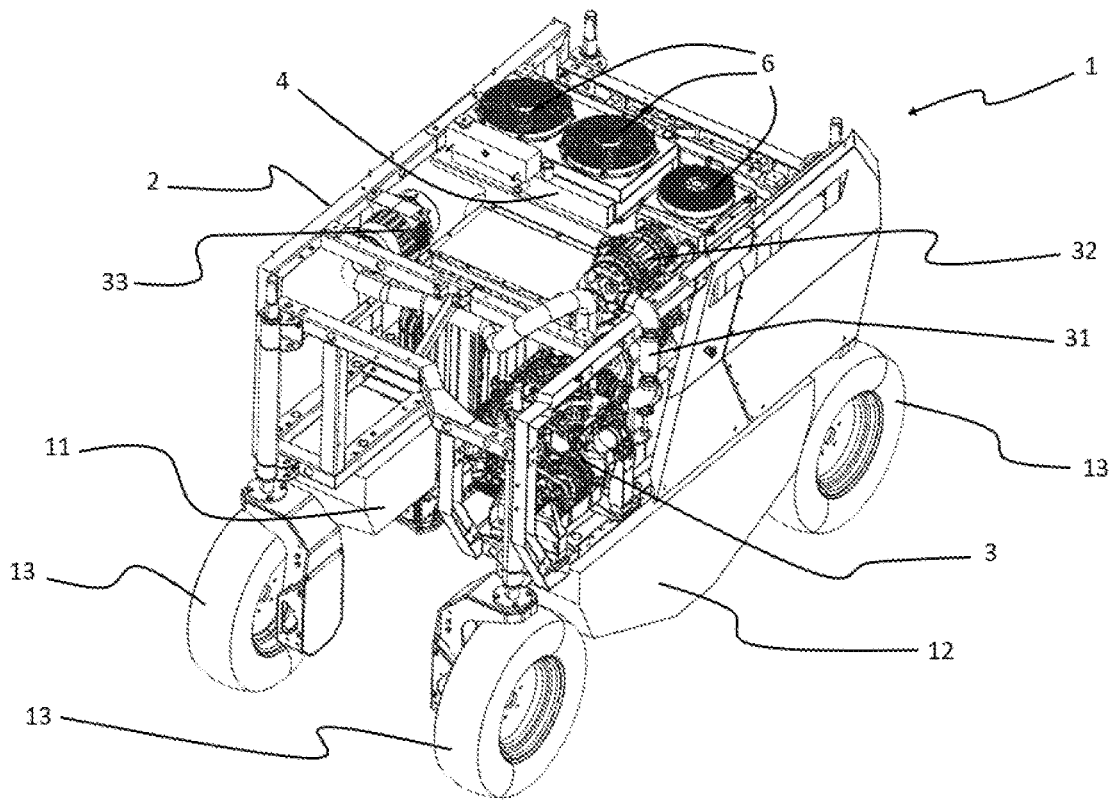
FIG. 1 shows a perspective view of an example of the autonomous agricultural machine according to the invention.
Figure 2:
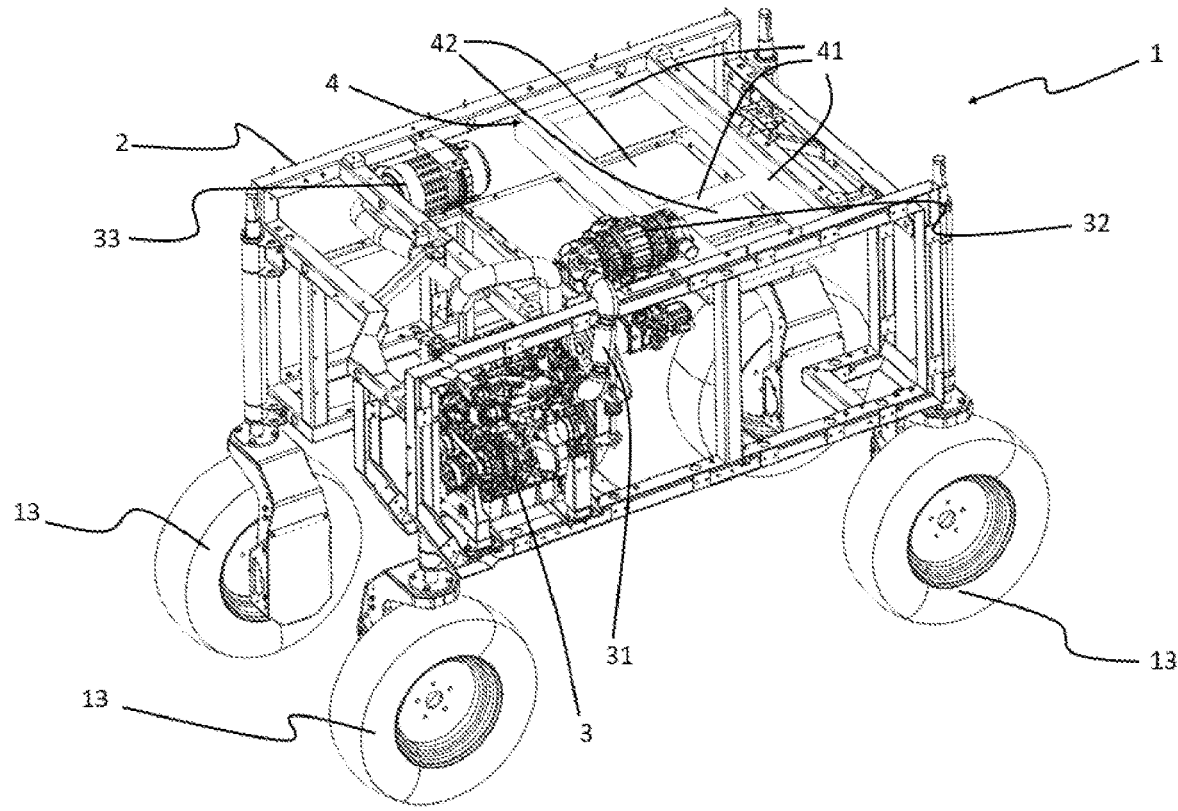
FIG. 2 shows a perspective view of an example of the autonomous agricultural machine according to the invention, showing the air circulation duct.
Figure 3:
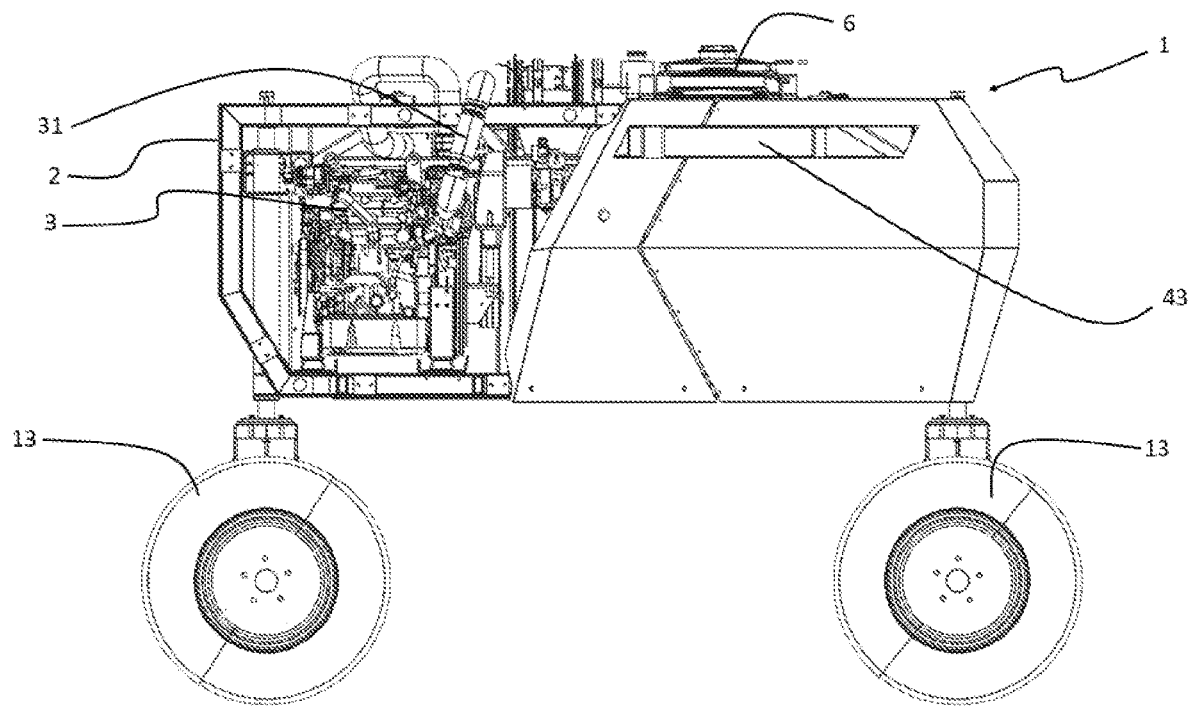
FIG. 3 shows a side view of an example of the autonomous agricultural machine according to the invention.

In reference to FIGS. 1 to 3, the present invention applies to an autonomous agricultural machine 1 equipped with collector panels and treatment product tanks, the autonomous agricultural machine being configured to allow spraying of a vineyard. However, this example is illustrative. The possibility of integrating collector panels and side treatment product tanks is advantageous and this possibility constitutes a preferred embodiment. However, the autonomous agricultural machine may be configured to perform other functions. In particular, the autonomous agricultural machine 1 may not be equipped with collector panels or product tanks, but may be equipped with a tool holder to which a trimmer or any other soil working tool is mounted.

Thus, the autonomous agricultural machine comprises a tool holder located in the track and in the wheelbase of the machine, in particular for holding tooling arranged on the sides of the machine, on the inside. The tool holder may hold a tooling of the trimmer type for example. The tool holder zone may also receive side collector panels, under which side tanks 11, 12 are arranged.

The autonomous agricultural machine 1 shown in FIGS. 1 to 3 comprises a frame 2 having an inverted U-section. The autonomous agricultural machine 1 here has side tanks 11 and 12 for containing a treatment product, in particular a liquid or a slurry, for treating crops, in particular vines.

The U-section comprises two vertical branches and a horizontal base defining the upper part of the frame 2. The frame 2 thus comprises two branches defining the sides of the autonomous agricultural machine 1 and a base defining a roof of the machine. The machine here has four wheels 13, i.e. two front wheels and two rear wheels. The front wheels have an axis of rotation and the rear wheels have an axis of rotation pivot axis, with the front and rear axes of rotation defining a wheelbase of the machine. The width of the frame 2, corresponding to the distance between the left wheels and the right wheels, defines the track of the autonomous agricultural machine 1. The autonomous agricultural machine 1 shown by way of illustration in FIGS. 1 to 3 thus forms an autonomous high-clearance spraying machine 1.

The autonomous agricultural spraying machine 1 here comprises collector panels configured to capture any droplet of treatment product passing through the vegetation to be treated. These collector panels are preferably combined with recovery tanks arranged below and connected to peristaltic pumps to reintroduce the recovered treatment product into the side tanks 11, 12.

The autonomous agricultural machine 1 further comprises an engine system based on a combustion engine 3, in particular of the diesel type, with its cooling system. The engine system comprises an exhaust device connected to the engine 3. Preferably, since the engine 3 is a diesel type, the exhaust device comprises, at the end of the exhaust manifold 31, a particulate filter 32. In particular, the particulate filter 32 is adapted to the European regulation for combustion engines of the diesel type.

The roof of the autonomous agricultural machine 1 is preferably as low as possible to ensure the lowest possible center of gravity and therefore better stability on slopes and cant.

In addition, when the autonomous agricultural machine 1 is configured, as here, for spraying, then the collector panels should preferably be arranged in the wheelbase and in the track of the machine.

According to the invention, the engine system is exploded: the air filter 33 is on the side opposite the engine 3. This allows the collector panels to be housed in the wheelbase and in the track without increasing the size or height of the autonomous agricultural machine 1. The engine 3 is cooled by a cooling system. The cooling system is configured to cool the engine 3 of the engine system, notably the water circulating in the engine 3, but also, if applicable, the oil circulating in hydraulic systems of the autonomous agricultural machine 1 and possibly the intake air at the outlet of a turbo when the engine system is equipped with it.

According to the invention, the cooling system comprises an air circulation duct 4 arranged immediately under the roof of the autonomous agricultural machine 1.

The air circulation duct 4 comprises corridors 41 with closed walls and comprises at least one opening 43 to allow the intake of outside air into the duct. The at least one opening 43 may have a grid to prevent the entry of foreign bodies.

Preferably, the air circulation duct 4 comprises two side corridors extending on the sides of the autonomous agricultural machine 1 and a rear corridor extending transversely, towards the rear of the machine.

The side corridors and the rear corridor may each comprise an air intake opening 43.

An advantage of the air circulation duct 4 located at the top of the autonomous agricultural machine 1 and comprising air intake openings 43, by definition also at the top of the machine, resides in the fact that the air drawn into the air circulation duct 4 and allowing the cooling of the engine 3 is less prone to contain plant residues compared to systems for which the air intake is carried out lower, in particular near vegetation. The air cooling system, in the invention, is thus less prone to soiling.

Fresh outside air is thus drawn into the air circulation duct 4 and supplies coolers to cool the respective fluids of the engine 3. The hot air is expelled upwards above the roof.

For example, the corridors 41 forming the duct comprise longitudinal and transverse corridors creating volumes, between these corridors, said volumes 42 receiving radiators configured to transmit to the air circulating in the duct the heat captured by heat exchange with the water circulating in the engine 3 or with the oil circulating in hydraulic circuits of the machine or with the intake air at the turbo outlet of the engine system, for the purpose of cooling these elements. In particular, three volumes 42 can thus be defined for three radiators.

In particular, the autonomous agricultural machine 1 comprises, on the roof of the machine, at least one fan 6 to circulate the air drawn into the air circulation duct 4. For example, the autonomous agricultural machine 1 comprises three electric fans 6 for this purpose. Alternatively, the autonomous agricultural machine 1 may comprise at least one hydraulic fan for this purpose.

An advantage of the invention is that, given the arrangement of the air circulation duct 4 at the top of the autonomous agricultural machine 1, at the roof corresponding to the base of the inverted U-shape of the frame 2, one may have a large-size air circulation duct, in particular extending substantially over the entire width of the autonomous agricultural machine 1, and over a substantial portion of its length. Thus, the pressure losses in the air circulation circulating in said air circulation duct 4 are reduced. Consequently, electric fans requiring no more than 25 A of current are sufficient to achieve proper operation of the cooling system, i.e. to compensate for the pressure losses and allow sufficient air circulation in the cooling system to ensure cooling of the engine 3, including the water circulating in the engine and/or the oil circulating in hydraulic circuits of the machine and/or intake air at the turbo outlet of the engine system.

The cooling system is thermally connected to the engine 3, with the water circulating in engine 3 being cooled by fresh air from the air circulation duct 4. The cooling system may also be thermally connected to the turbo of the engine system, if equipped with it, with the intake air at the outlet of the turbo being cooled by the fresh air from the air circulation duct 4. The cooling system can also be thermally connected to hydraulic circuits of the autonomous agricultural machine, the oil circulating in these hydraulic circuits being cooled by the air circulating in the air circulation duct 4.

In addition, in the case where the engine system comprises a turbo, the intake air at the outlet of the turbo may also be cooled by the fresh air circulating in the air circulation duct 4, in particular by means of an intermediate cooler (referred to as "intercooler"), making it possible to cool the intake air at the outlet of the turbo, and thus increase the performance and quality of the combustion in the engine 3, and reduce consumption.

Figure 4:
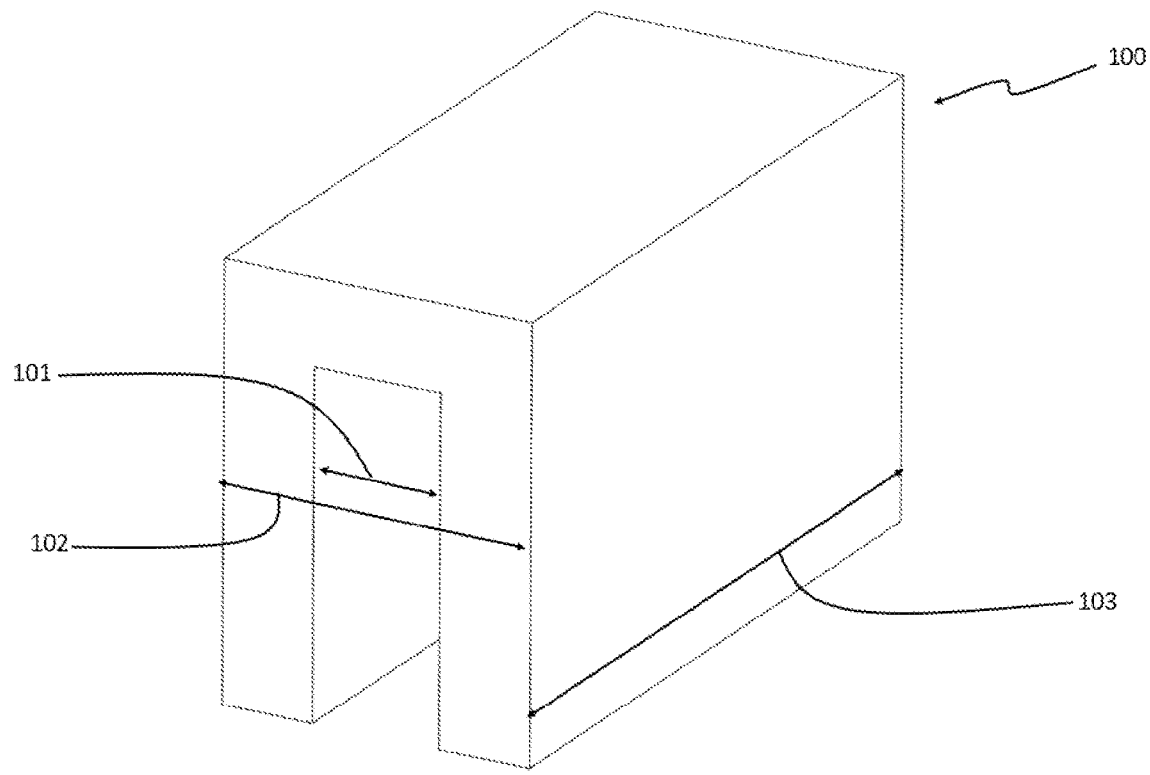
FIG. 4 shows a gage of the autonomous agricultural machine.

Note that the absence of an offset element improves safety. Indeed, the autonomous agricultural machine 1 fits into a gage, shown in FIG. 4. No tooling or element protrudes from this gage 100, any tooling being confined inside the tunnel delimited by the frame 2. Thus, it is not possible for an accident to occur due to tooling located offset from the frame 2. This simplifies the safety management of the autonomous agricultural machine 1. The gage 100 is defined by the desired use of the autonomous agricultural machine 1. In particular, the inner width 101 of the tunnel defined by the gage 100 and the frame 2 of the autonomous agricultural machine 1 is for example adapted to straddle a row of vines. The outer width 102 of the gage 100 is adapted to allow for example the autonomous agricultural machine 1 to circulate between rows adjacent to the straddled row.

The length 103 of the gage is furthermore limited by the desired use of the autonomous agricultural machine 1. In particular, the length 103 is limited such that the maneuverability of the autonomous agricultural machine 1 is adapted to the use, in particular the spraying of vines.

The machine may thus carry collector panels without increasing the wheelbase and without overhanging the track of the machine.

In particular, the autonomous agricultural machine also has at least one main forward pump, a booster pump of the main forward pump and an accessory pump arranged in a volume located between the tool holder zone, where, for example, collector panels are located, and the roof. In particular, the main forward pump is configured to supply hydraulic energy to hydraulic systems enabling the moving forward of the autonomous agricultural machine 1. The accessory pump supplies in particular hydraulic energy to hydraulic systems allowing the animation of tooling mounted on the tool holder of the autonomous agricultural machine 1. The offsetting of these pumps is made possible in particular by the implementation of a belt or chain drive, for example.

The power of the engine 3 is in particular over 50 hp. In particular, the engine is a diesel engine.

The invention claimed is:

1. An autonomous agricultural machine comprising a frame having an inverted U section, to which at least one front wheel and at least one rear wheel are connected and defining a track, the frame having two sides, corresponding to the branches of the inverted U and a roof, corresponding to the base of the inverted U, the autonomous agricultural machine further comprising a combustion engine system comprising an engine, the autonomous agricultural machine comprising a cooling system having an air circulation duct arranged in an upper part of the frame, directly under the roof, the air circulation duct having at least one opening to allow the intake of outside air into the air circulation duct and an upper air outlet to expel hot air upwards, above the roof, the cooling system also comprising a ventilation device to ensure air circulation in the air circulation duct, the air circulation duct being configured to allow air circulation to cool the engine, in particular to cool a flow of water circulating in the engine and/or an oil flow circulating in hydraulic circuits of hydraulic systems of the autonomous agricultural machine.

2. The autonomous agricultural machine according to claim 1, wherein the air circulation duct comprises longitudinal and transverse corridors arranged to create, between these corridors, at least one volume, the autonomous agricultural machine comprising at least one radiator arranged in said volume, so as to dissipate heat into the air circulating in the air circulation duct.

3. The autonomous agricultural machine according to claim 1, the ventilation device comprising at least one fan disposed above the roof.

4. The autonomous agricultural machine according to claim 1, the air circulation duct having a rear opening and two longitudinal openings to allow the intake of outside air into the air circulation duct.

5. The autonomous agricultural machine according to claim 1, the at least one opening of the air circulation duct being closed by a grid configured to allow air to pass and to block the intake of foreign bodies into the air circulation duct.

6. The autonomous agricultural machine according to claim 5, the engine system also comprising an exhaust device and an air filter, the engine being arranged on one side of the frame, i.e. substantially in alignment with a branch of the U-section of the frame, and the air filter being arranged opposite the engine, i.e. substantially in alignment with an opposite branch of the U-section of the frame, the air filter being connected to the engine by an air circulation channel.

7. The autonomous agricultural machine according to claim 1, further comprising at least one main forward pump, a booster pump of the main forward pump and an accessory pump arranged in a volume located between a tool holder zone, located in the track and in the wheelbase of the autonomous agricultural machine, and the roof, the main forward pump being configured to provide hydraulic energy to hydraulic systems allowing the moving forward of the autonomous agricultural machine and the accessory pump being configured to provide hydraulic energy to hydraulic systems allowing the animation of tooling mounted on the tool holder.

8. The autonomous agricultural machine according to claim 7, comprising a turbo and an intermediate cooler, wherein the cooling system is further configured to cool an intake air circulation at the outlet of the turbo, the intake air circulation at the outlet of the turbo being cooled by the air circulating in the air circulation duct by means of the intermediate cooler.

9. The autonomous agricultural machine according to claim 1, the engine being a diesel engine having power greater than 50 hp.

10. The autonomous agricultural machine according to claim 1, forming an autonomous agricultural spraying machine comprising two side tanks substantially arranged between the front wheel and the rear wheel, respectively on each side of the autonomous agricultural spraying machine, the autonomous agricultural spraying machine further comprising a spraying system, the spraying system comprising at least two side collector panels, the side tanks and the collector panels being located in the track of the autonomous agricultural spraying machine, corresponding to its width, substantially in the alignment of each side defined by the frame, on each side of the autonomous agricultural spraying machine.

11. A method of making an autonomous agricultural machine comprising a frame having an inverted U section, to which at least one front wheel and at least one rear wheel are connected and defining a track, the frame having two sides, corresponding to branches of the inverted U section and a roof, corresponding to a base of the inverted U section, the method comprising:

mounting a combustion engine system comprising an engine to the frame, mounting a cooling system having an air circulation duct arranged in an upper part of the frame, directly under the roof, the air circulation duct having at least one opening to allow the intake of outside air into the air circulation duct and an upper air outlet to expel hot air upwards, above the roof, including a ventilation device with the cooling system for air circulation in the air circulation duct, the air circulation duct being configured to allow air circulation to cool the engine, placing two tanks substantially arranged between the front wheel and the rear wheel, respectively, with one tank on each side of the autonomous agricultural spraying machine, and adding a spraying system, the spraying system comprising at least two side collector panels, wherein the tanks and the at least two side collector panels being located in the track of the autonomous agricultural spraying machine.

12. The method of claim 11, wherein one tank and at least one side collector panel are substantially aligned on each side of the frame on each side of the autonomous agricultural spraying machine.

13. The method of claim 11, wherein the cooling system is configured to cool at least one of a flow of water circulating in the engine and an oil flow circulating in hydraulic circuits of a hydraulic system of the autonomous agricultural machine.

* * * * *